(12) United States Patent
Salas Nobrega et al.

(10) Patent No.: US 9,601,951 B2
(45) Date of Patent: Mar. 21, 2017

(54) MODULAR PERMANENT MAGNET MOTOR AND PUMP ASSEMBLY

(71) Applicant: General Electric Company, Schenectady, NY (US)

(72) Inventors: Ken Ivcar Salas Nobrega, Schenectady, NY (US); Jeremy Daniel Van Dam, West Coxsackie, NY (US); Manoj Ramprasad Shah, Latham, NY (US); William Dwight Gerstler, Niskayuna, NY (US); Tsarafidy Raminosoa, Niskayuna, NY (US); Edward John Flett, Oklahoma City, OK (US); Patel Bhageerath Reddy, Niskayuna, NY (US); James Pellegrino Alexander, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 188 days.

(21) Appl. No.: 14/070,795

(22) Filed: Nov. 4, 2013

(65) Prior Publication Data
US 2015/0123506 A1    May 7, 2015

(51) Int. Cl.
*H02K 21/12*    (2006.01)
*H02K 5/12*    (2006.01)
(Continued)

(52) U.S. Cl.
CPC ............. *H02K 1/274* (2013.01); *H02K 1/276* (2013.01); *H02K 1/278* (2013.01); *H02K 5/132* (2013.01); *H02K 16/02* (2013.01); *Y02E 20/16* (2013.01)

(58) Field of Classification Search
CPC ................................. H02K 1/27; H02K 21/12
(Continued)

(56) References Cited

U.S. PATENT DOCUMENTS

| 5,117,553 A | 6/1992 | Kliman |
| 5,189,328 A | 2/1993 | Knox |

(Continued)

FOREIGN PATENT DOCUMENTS

| DE | 19942029 A1 | 3/2001 |
| EP | 1037359 A1 | 9/2000 |

(Continued)

OTHER PUBLICATIONS

A PCT Search Report and Written Opinion issued in connection with corresponding Application No. PCT/US2014/060476 on Aug. 14, 2015.

*Primary Examiner* — Jose Gonzalez Quinones
(74) *Attorney, Agent, or Firm* — Andrew J. Caruso (57) ABSTRACT

A permanent magnet machine, a rotor assembly for the machine, and a pump assembly. The permanent magnet machine includes a stator assembly including a stator core configured to generate a magnetic field and extending along a longitudinal axis with an inner surface defining a cavity and a rotor assembly including a rotor core and a rotor shaft. The rotor core is disposed inside the cavity and configured to rotate about the longitudinal axis. The rotor assembly further including a plurality of permanent magnets for generating a magnetic field which interacts with the stator magnetic field to produce torque. The permanent magnets configured as one of internal or surface mounted. The rotor assembly also including a plurality of retaining clips configured to retain the plurality of permanent magnets relative to the rotor core. The pump assembly including an electric submersible pump and a permanent magnet motor for driving the pump.

20 Claims, 8 Drawing Sheets (51) Int. Cl.
*H02K 3/487* (2006.01)
*H02K 1/27* (2006.01)
*H02K 5/132* (2006.01)
*H02K 16/02* (2006.01)

(58) Field of Classification Search
USPC .............. 310/154.33, 156.36, 156.37, 15.33,
310/156.376, 87, 90.5, 156.16, 156.19,
310/214
See application file for complete search history.

(56) References Cited

U.S. PATENT DOCUMENTS

| | | | |
|---|---|---|---|
| 5,659,214 A | 8/1997 | Guardiani et al. | |
| 5,674,057 A | 10/1997 | Guardiani et al. | |
| 5,923,111 A * | 7/1999 | Eno | E21B 43/128 310/153 |
| 6,045,333 A | 4/2000 | Breit | |
| 6,424,105 B1 | 7/2002 | Breit et al. | |
| 6,492,755 B1 | 12/2002 | Jones | |
| 7,242,128 B2 | 7/2007 | Innami et al. | |
| 7,316,270 B2 | 1/2008 | Shen | |
| 7,518,333 B1 | 4/2009 | Fisher | |
| 7,971,650 B2 | 7/2011 | Yuratich et al. | |
| 8,333,575 B2 | 12/2012 | Grann et al. | |
| 8,408,312 B2 | 4/2013 | Fielder et al. | |
| 2006/0133919 A1 | 6/2006 | Dooley | |
| 2006/0175064 A1 | 8/2006 | Yuratich | |
| 2007/0096571 A1 | 5/2007 | Yuratich | |
| 2007/0273225 A1 | 11/2007 | Head | |
| 2008/0284268 A1* | 11/2008 | Yuratich | E21B 43/128 310/156.09 |
| 2009/0010783 A1 | 1/2009 | Appel et al. | |
| 2009/0226335 A1 | 9/2009 | Lee | |
| 2009/0232664 A1 | 9/2009 | Qu et al. | |
| 2010/0129239 A1 | 5/2010 | Hadar et al. | |
| 2010/0155076 A1 | 6/2010 | Scarsdale et al. | |
| 2010/0259135 A1 | 10/2010 | Shimamura et al. | |
| 2010/0277028 A1 | 11/2010 | Alexander et al. | |
| 2011/0043065 A1* | 2/2011 | Piercey | F03D 9/002 310/156.12 |

FOREIGN PATENT DOCUMENTS

| | | | |
|---|---|---|---|
| EP | 1235329 B1 | | 1/2007 |
| JP | 09322446 | * | 5/1996 |
| JP | 2000116038 | * | 4/2000 |
| JP | 2003259578 A | | 9/2003 |
| JP | 2013099038 A | | 5/2013 |
| WO | 2012113416 A2 | | 8/2012 |

* cited by examiner

MODULAR PERMANENT MAGNET MOTOR AND PUMP ASSEMBLY

BACKGROUND

The present disclosure relates to permanent magnet motors. More particularly, the present disclosure relates to a permanent magnet motor including a plurality of rotor modules and a pump assembly including an electric submersible pump driven by a permanent magnet motor.

Permanent magnet machines such as permanent magnet motors or generators have been widely used in a variety of applications including aircraft, automobile, subsea and industrial usage. A requirement for lightweight and high power density permanent magnet machines has resulted in the design of higher speed motors and generators to maximize the power to weight ratios. Hence, the trend is increasing acceptance of permanent magnet machines offering high machine speed, high power density, reduced mass and cost.

Permanent magnet motors typically employ permanent magnets either in the rotor, the stator or both. In most instances, the permanent magnets are found within the rotor assembly. The output power of the permanent magnet motor is determined by the length of the stator and rotor assemblies. A longer axial length corresponds to increased power.

In one application, permanent magnet machines, and more particularly, permanent magnet motors may be used to drive an electric submersible pump. Currently, the majority of electric submersible pumps are driven by induction motors. Permanent magnet motors can provide a larger torque such that the number of motors needed to drive the electric submersible pump may be reduced, therefore decreasing the overall system cost and complexity. The use of permanent magnet motors also enables efficient pump operation at higher speeds, thus increasing the pumping capacity. In addition, the efficiency of the permanent magnet motor is higher than the induction alternative so that overall system efficiency is increased.

In conventional permanent magnet machines, multiple permanent magnets are positioned as either internal magnets, and more particularly embedded inside multiple laminations of a rotor core, or surface mounted on an exterior portion of the rotor core. With internally positioned magnets, the mechanical stresses in the rotor are concentrated in multiple bridges and center posts. For higher speed applications, the thickness of the multiple bridges and center posts have to be increased for enhanced structural strength of the rotor and various other parts. The increased thickness leads to more magnet flux leakage into the multiple bridges and center posts, which leakage significantly reduces the machine power density, resulting in decreased efficiency of the machine. With surface mounted magnets, magnets are positioned on an exterior portion of the rotor. Hence, the magnets need some retention system against centrifugal forces occurring during rotation. A retaining sleeve is often used for this purpose, but the introduction of a retaining sleeve increases the effective magnetic airgap and introduces additional eddy current losses if the sleeve is metallic. This significantly reduces the machine power density, resulting in decreased efficiency of the machine.

Therefore, it is desirable to have a permanent magnet machine with high power density and efficiency. In addition, it is desirable to provide a permanent magnet machine for driving an electric submersible pump.

BRIEF DESCRIPTION

These and other shortcomings of the prior art are addressed by the present disclosure, which provides a rotor assembly for a permanent magnet machine, a permanent magnet machine and a pump assembly.

One aspect of the present disclosure resides in a rotor assembly for a permanent magnet machine configured to rotate about a longitudinal axis. The rotor assembly comprises a rotor shaft and a plurality of rotor modules. The plurality of rotor modules is configured to generate a magnetic field, whose magnetic field interacts with a stator magnetic field to produce a torque. The plurality of rotor modules is disposed about the rotor shaft in an end-to-end axial alignment and cooperative engagement. Each of the plurality of rotor modules comprises a rotor core, plurality of permanent magnets and a plurality of retaining clips. The plurality of retaining clips are configured to retain the plurality of permanent magnets relative to the to the rotor core.

Another aspect of the present disclosure resides in a permanent magnet machine. The permanent magnet machine comprises a stator assembly and a rotor assembly. The stator assembly comprises a stator assembly comprising a stator core and including stator windings to generate a stator magnetic field when excited with alternating currents. The stator assembly extends along a longitudinal axis with an inner surface defining a cavity. The rotor assembly is disposed inside said cavity and configured to rotate about the longitudinal axis. The rotor assembly comprises a plurality of rotor modules configured to generate a magnetic field, which magnetic field interacts with a stator magnetic field to produce a torque. Each of the plurality of rotor modules comprises a rotor core, a plurality of permanent magnets and a plurality of retaining clips configured to retain the plurality of permanent magnets relative to the to the rotor core.

Yet another aspect of the disclosure resides in a pump assembly. The pump assembly comprises an electric submersible pump (ESP) and a permanent magnet motor configured to drive the electric submersible pump. The permanent magnet motor comprises a stator assembly and a rotor assembly. The stator assembly comprises a stator core and including stator windings to generate a stator magnetic field when excited with alternating currents, the stator assembly extending along a longitudinal axis with an inner surface defining a cavity. The rotor assembly is disposed inside said cavity and configured to rotate about the longitudinal axis. The rotor assembly comprises a rotor shaft and a plurality of rotor modules. The plurality of rotor modules are configured to generate a magnetic field, which magnetic field interacts with a stator magnetic field to produce a torque. The plurality of rotor modules are disposed about the rotor shaft in an end-to-end axial alignment and cooperative engagement. Each of the plurality of rotor modules comprises a rotor core, a plurality of permanent magnets and a plurality of retaining clips configured to retain the plurality of permanent magnets relative to the to the rotor core.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

As described in detail below, embodiments of the present disclosure provide a permanent magnet motor and a permanent magnet motor for use in driving an electric submersible pump. Using such disclosed configurations, the permanent magnet motor may include efficiency of the motor and thus pumping system, reduced system complexity due to a potentially lower number of motors required to drive a pump and potential for efficient operation at high speeds.

The terms "first," "second," and the like, herein do not denote any order, quantity, or importance, but rather are used to distinguish one element from another and intended for the purpose of orienting the reader as to specific components parts. Approximating language, as used herein throughout the specification and claims, may be applied to modify any quantitative representation that could permissibly vary without resulting in a change in the basic function to which it is related. The modifier "about" used in connection with a quantity is inclusive of the stated value, and has the meaning dictated by context, (e.g., includes the degree of error associated with measurement of the particular quantity). Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. In addition, in this specification, the suffix "(s)" is usually intended to include both the singular and the plural of the term that it modifies, thereby including one or more of that term (e.g., "the rotor module" may include one or more rotor modules, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be". The terms "comprising," "including," and "having" are intended to be inclusive and mean that there may be additional elements other than the listed elements. Any examples of operating parameters are not exclusive of other parameters of the disclosed embodiments.

As discussed in detail below, embodiments of the disclosure are directed towards a permanent magnet machine, a pump system including a pump driven by a permanent magnet machine and a method for assembling the same. The permanent magnet machine includes a stack of laminations forming a rotor core and configured for engagement with multiple permanent magnets, which laminations are mounted circumferentially around a shaft in a rotor assembly. In particular, the present disclosure is directed to a fluid-filled permanent magnet machine operating at a relatively low speed as determined by the tip speed of the rotor (<20 m/s). The fluid between the rotor assembly and a stator assembly is intended to resist the external pressure acting on the machine and to ventilate the machine. In a submersible pump application, the permanent magnet motor is expected to be optimized for a narrow speed range spanning from approximately one-half up to its running speed. This is in contrast to hybrid vehicle applications which require nearly constant torque from nearly zero speed to rated speed.

Figure 1:
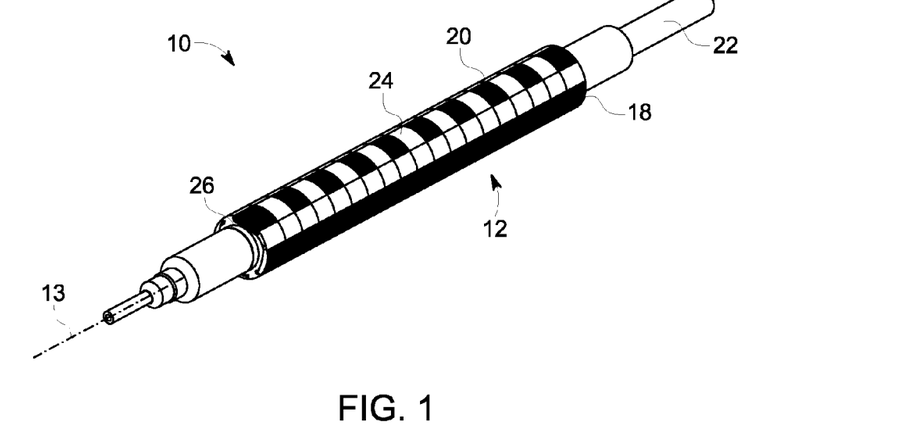
FIG. 1 is an isometric view of a rotor assembly of a permanent magnet machine in accordance with one or more embodiments shown or described herein.
Figure 2:
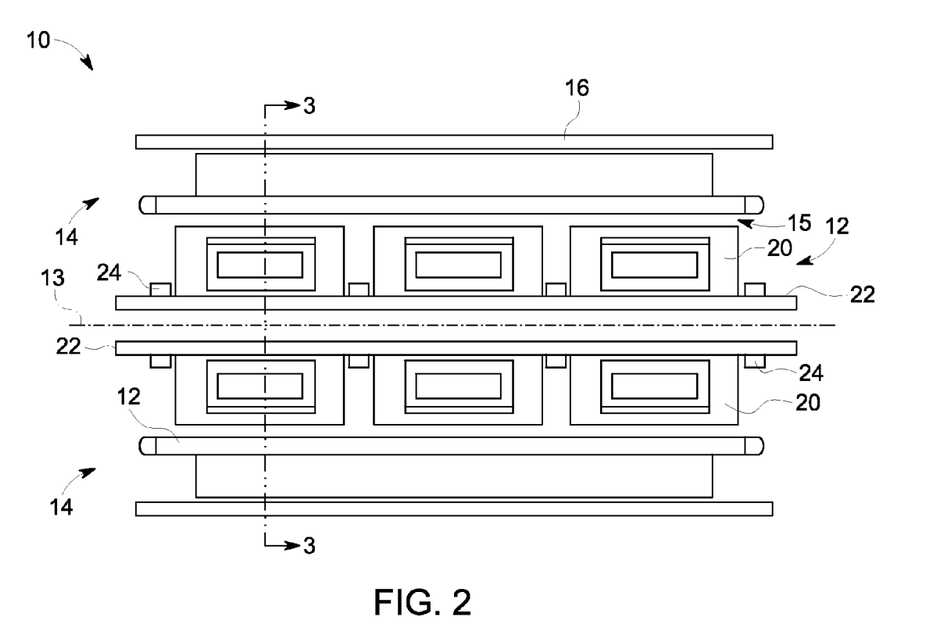
FIG. 2 is a longitudinal cross-sectional view of a portion of a rotor and stator assembly of a permanent magnet machine in accordance with one or more embodiments shown or described herein.

Referring now to the figures, FIGS. 1-5 illustrate a permanent magnet machine, and more particularly a permanent magnet motor according to the present disclosure including a plurality of internal permanent magnets and FIGS. 6-9 illustrate a permanent magnet motor including a plurality of surface mounted permanent magnets. Referring specifically to FIGS. 1 and 2, illustrated is a portion of a permanent magnet machine, and more particularly a permanent magnet motor 10, according to an embodiment. FIG. 1 illustrates in an isometric view a rotor assembly 12 configured along a longitudinal axis 13. FIG. 2 illustrates in a longitudinal cross-section, a portion of the permanent magnet motor 10, including the rotor assembly 12 and a stator assembly 14 configured along the longitudinal axis 13 and disposed therein a well casing 16. As best illustrated in FIG. 2, the rotor assembly 12 and the stator assembly 14 are spaced apart to define therebetween an air gap 15. In FIG. 1, an optional cylindrical cover 18 of the rotor assembly 12 is illustrated as partially removed to illustrate a plurality of individual rotor modules 20 of the rotor assembly 12. The rotor assembly 12 includes the plurality of individual rotor modules 20 disposed about a rotor shaft 22 in an end-to-end axial alignment. Each of the plurality of rotor modules 20 is comprised of a plurality of permanent magnets (described presently) axially and circumferentially disposed around or within a rotor core (described presently). The plurality of individual rotor modules 20 are configured to rotate about the longitudinal axis 13 of the permanent magnet machine. The rotor assembly 12 may optionally include a plurality of bearings 24 disposed therebetween each of the individual rotor modules 20 and in an end position on the axial ends of the rotor shaft 22, referred to as end bearings 26, to retain the plurality of individual rotor modules 20 thereon the rotor shaft 22 and to manage the lateral dynamic performance of the rotor assembly 12. The number of rotor modules 20 disposed about the rotor shaft 22 is dependent upon the desired power output of the overall motor assembly, with the more rotor modules 20 included, the higher the power output. In an embodiment, the stator assembly 14 is configured as a continuous stator spanning all the individual rotor modules 20.

Figure 3:
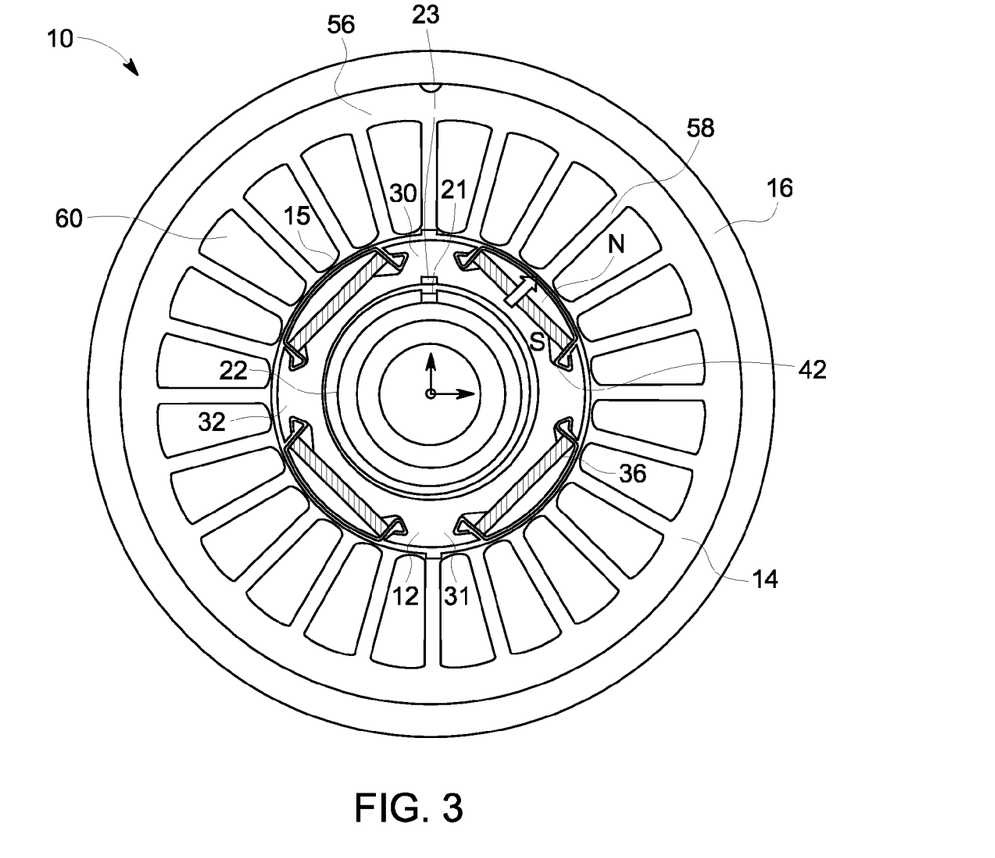
FIG. 3 is an axial cross-sectional view of a rotor and stator assembly taken through line 3-3 of the permanent magnet machine of FIG. 2 in accordance with one or more embodiments shown or described herein.
Figure 4:
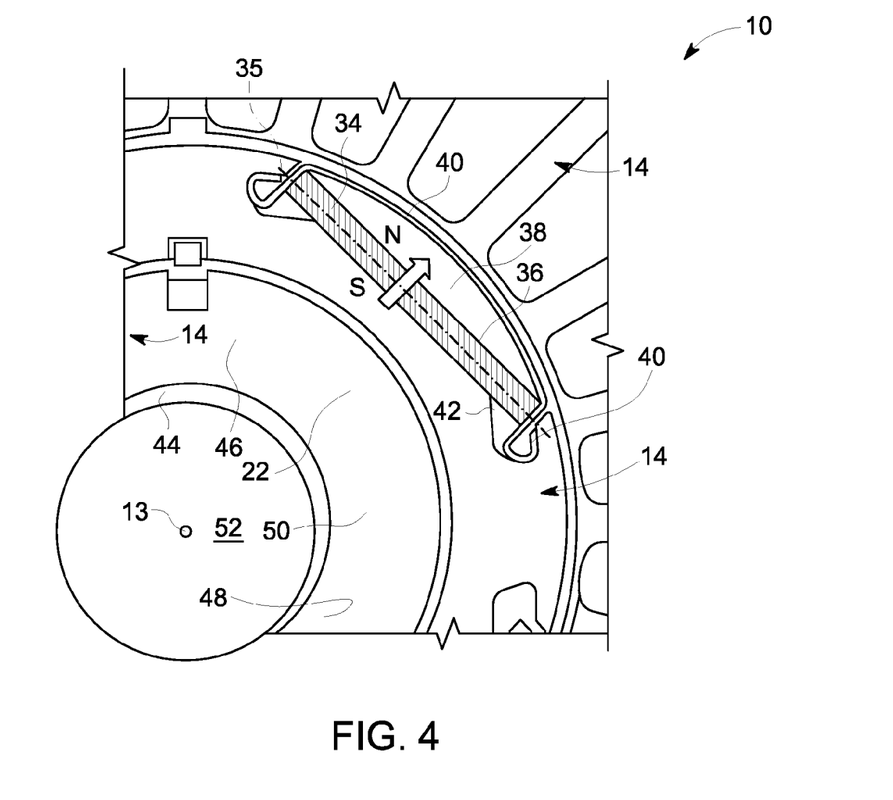
FIG. 4 is an enlarged portion of the axial cross-sectional view of the rotor and stator assembly of FIG. 3 in accordance with one or more embodiments shown or described herein.

Referring now to FIGS. 3 and 4, illustrated in FIG. 3 is an axial cross-sectional view taken along line 3-3 of FIG. 2 of a portion of the permanent magnet motor 10, and more specifically through the stator assembly 14 and a single rotor module of the plurality of rotor modules 20 of the rotor assembly 12. FIG. 4 illustrates an axial cross-sectional view of an enlarged portion of the permanent magnet motor 10 of FIG. 3. As illustrated, the rotor assembly 12, and more particularly each of the rotor modules 20 is comprised of a rotor core 30 formed of a plurality of clamped laminations 31. The rotor assembly 12 further includes the rotor shaft 22 coupled to the rotor core 12. In an embodiment, the rotor shaft 22 and the rotor core 30 may be keyed so as to be in cooperative engagement. In an embodiment, the rotor shaft may include one or more features, such as protrusions 21, in cooperative engagement with one or more features, such as recesses 23, in the rotor core 12, or vice versa. In an embodiment, the shaft 22 may include additional features configured to provide passages for a cooling fluid (not shown) within the rotor core 30. In a non-limiting example, the cooling fluid may be airflow or a coolant for reducing mechanical stresses and eddy current losses in the rotor assembly 12.

Furthermore, the rotor assembly 12 includes a plurality of permanent magnets 34 disposed within a plurality of cavities, or voids, 36 formed in the rotor core 12, and more particularly defined therein the plurality of laminations 31. The magnetization direction of the permanent magnets 34 may be described as being circumferential or non-radial. The permanent magnets 34 generate a magnetic field to be radially directed in the air gap 15 between the rotor assembly 12 and the stator assembly 14. The magnetic field generated by the permanent magnets 34 further interacts with a stator magnetic field to produce a torque. As best illustrated in FIG. 4, the permanent magnets 34 are disposed within cavities 36 formed in the rotor core 30. A keeper magnetic block 38 is positioned relative to each permanent magnet 34 to act as a ferromagnetic pole and to allow each of the permanent magnets 34 to be configured having a simple rectangular shape. Furthermore, a plurality of retaining clips 40 are disposed relative to the rotor core 30 and in engagement with the cavities 36 formed therein so as to maintain positioning of the permanent magnets 34 and the keeper magnetic blocks 38 within the cavities 36. More specifically, the each of the plurality of retaining clips 40 are configured to retain the multiple permanent magnets 34 in the rotor assembly 12 and prevent splaying during high-speed rotations due to a centrifugal force generated in the high-speed rotor core 12. In an embodiment, each of the plurality of retaining clips 40 is configured to provide spring-loaded retainment of one of the plurality of permanent magnets 34 within a respective cavity 36. In this particular embodiment, the plurality of permanent magnets 34 are configured having a long axis 35 oriented substantially circumferentially within the rotor core 30.

In one embodiment, the permanent magnets 34 may be made of neodymium-boron-iron. In another embodiment, the permanent magnets 34 are made of samarium-cobalt, or ferrite, or Alnico. In an embodiment, a filler material 42 may be disposed within the plurality of cavities 36 to reduce the risk of magnet crack and to further provide containment in case of magnet crack.

Furthermore, in the illustrated embodiment the rotor assembly 12 includes a stationary tube 44 arranged co-axially in the center of the rotor core 12. An inner surface 46 of the rotor shaft 22 and an outer surface 48 of the stationary tube 44 provide a rotor inner bore 50 for out flow of a cooling fluid. In one embodiment, the stationary tube 44 is a hollow tube with a center bore 52 for allowing an inflow of cooling fluid. In an alternate embodiment, the stationary tube 44 is optional.

Referring again to FIG. 3, the stator assembly 14 of the permanent magnet motor 10 includes a stator core 56. As illustrated herein, the stator core 56 includes stator structures 58 arranged circumferentially and forming a cavity (illustrated with the rotor assembly 12 disposed therein) at a center of the stator core 56. The stator assembly 14 generates a magnetic field and extends along the longitudinal axis 13 (shown in FIG. 1). The rotor assembly 12, as discussed above, is disposed within the cavity defined by the stator core 56. The stator assembly 14 includes multiple stator-slots 60 for concentrated windings (not shown) in between multiple stator structures 58. In one embodiment, the concentrated windings include copper coils. In another embodiment, the stator assembly 14 includes fractional-slot concentrated windings.

Figure 5:
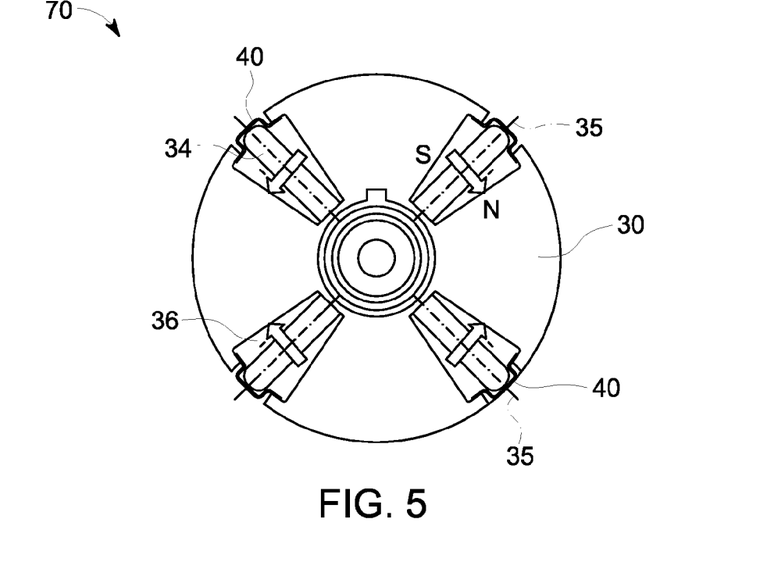
FIG. 5 is an axial cross-sectional view of an alternate embodiment of a rotor assembly of a permanent magnet machine in accordance with one or more embodiments shown or described herein.

Referring now to FIG. 5, illustrated is an alternate embodiment of a rotor assembly 70, generally similar to rotor assembly 12 of FIGS. 1-4. In this particular embodiment, the rotor assembly 70 includes a rotor core 30 having formed therein a plurality of cavities 36 within each having disposed a permanent magnet 34. In this particular embodiment, the plurality of permanent magnets 34 are configured having a long axis 35 oriented to extend substantially radially within the rotor core 30 relative to the shaft 22. More specifically, the magnetization direction of the permanent magnets 34 are described as being radially inward or outward. A plurality of retaining clips 40 are configured so as to engage with the cavities 36 and provide retainment of each of the permanent magnets 34 in its respective cavity 36.

Figure 6:
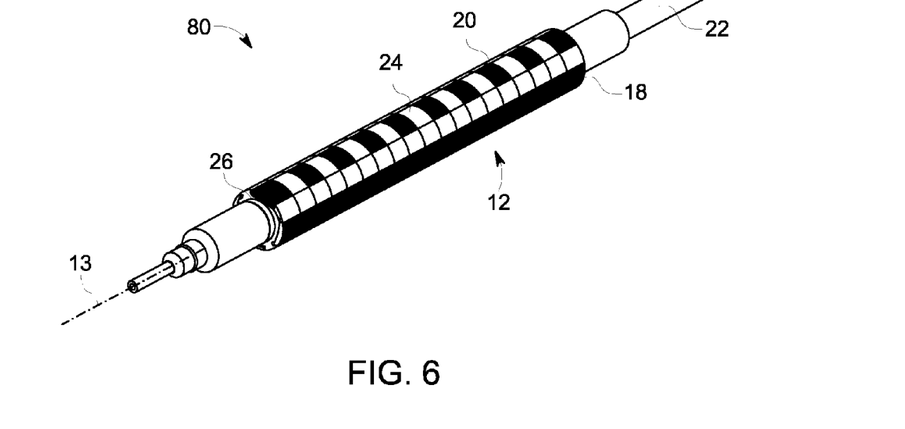
FIG. 6 is an isometric view of a rotor assembly of a permanent magnet machine in accordance with one or more embodiments shown or described herein.
Figure 7:
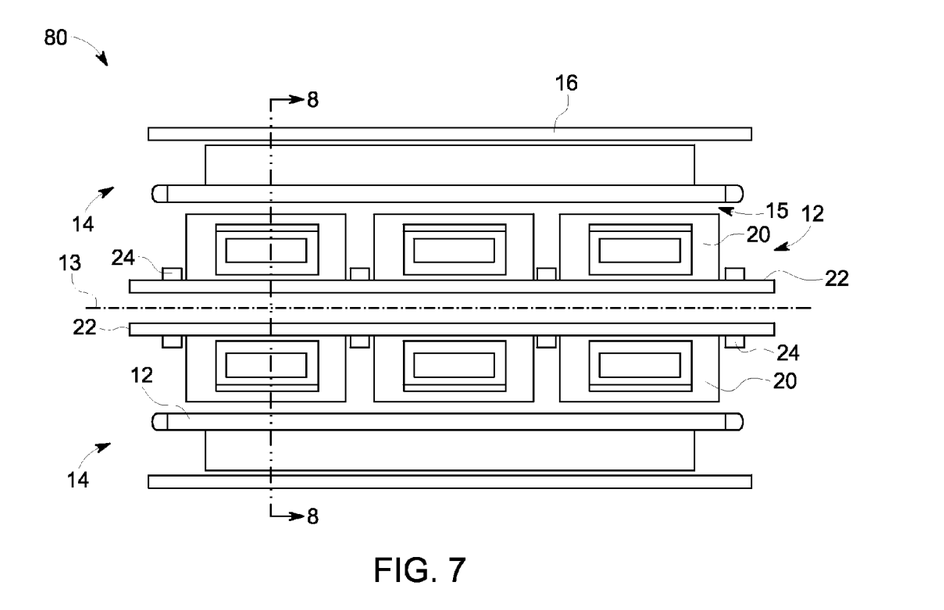
FIG. 7 is a longitudinal cross-sectional view of a portion of a rotor and stator assembly of a permanent magnet machine in accordance with one or more embodiments shown or described herein.

FIGS. 6-9 illustrate another embodiment of permanent magnet motor including a plurality of surface mounted permanent magnets. Referring specifically to FIGS. 6 and 7, illustrated is a portion of a permanent magnet machine, and more particularly a permanent magnet motor 80, according to an embodiment. It should be understood that for simplicity, like elements have like numbers throughout the disclosed embodiments. FIG. 6 illustrates in an isometric view a rotor assembly 12 configured along a longitudinal axis 13. FIG. 7 illustrates in a longitudinal cross-section, a portion of the permanent magnet motor 80, including the rotor assembly 12 and a stator assembly 14 configured along the longitudinal axis 13 and disposed therein a well casing 16. The rotor assembly 12 and the stator assembly 14 are spaced apart to define therebetween an air gap 15. In FIG. 6, an optional cylindrical cover 18 of the rotor assembly 12 is illustrated as partially removed to illustrate a plurality of individual rotor modules 20 of the rotor assembly 12. The rotor assembly 12 includes the plurality of individual rotor modules 20 disposed about a rotor shaft 22 in an end-to-end axial alignment. Each of the plurality of rotor modules 20 is comprised of a plurality of permanent magnets (described presently) axially and circumferentially disposed around or within a rotor core (described presently). The plurality of individual rotor modules 20 are configured to rotate about the longitudinal axis 13 of the permanent magnet machine. The rotor assembly 12 may optionally include a plurality of radial bearings 24 disposed therebetween each of the individual rotor module 20 and in an end position on a plurality of axial ends of the rotor shaft 22, referred to as end bearings 26, to retain the plurality of individual rotor modules 20 thereon the rotor shaft 22 and to manage the lateral dynamic performance of the rotor assembly 12. As previously indicated, the number of rotor modules 20 disposed about the rotor shaft 22 is dependent upon the desired power output of the overall motor assembly. As described in the previous embodiments, the stator assembly 14 is configured as a continuous stator spanning all the individual rotor modules 20.

Figure 8:
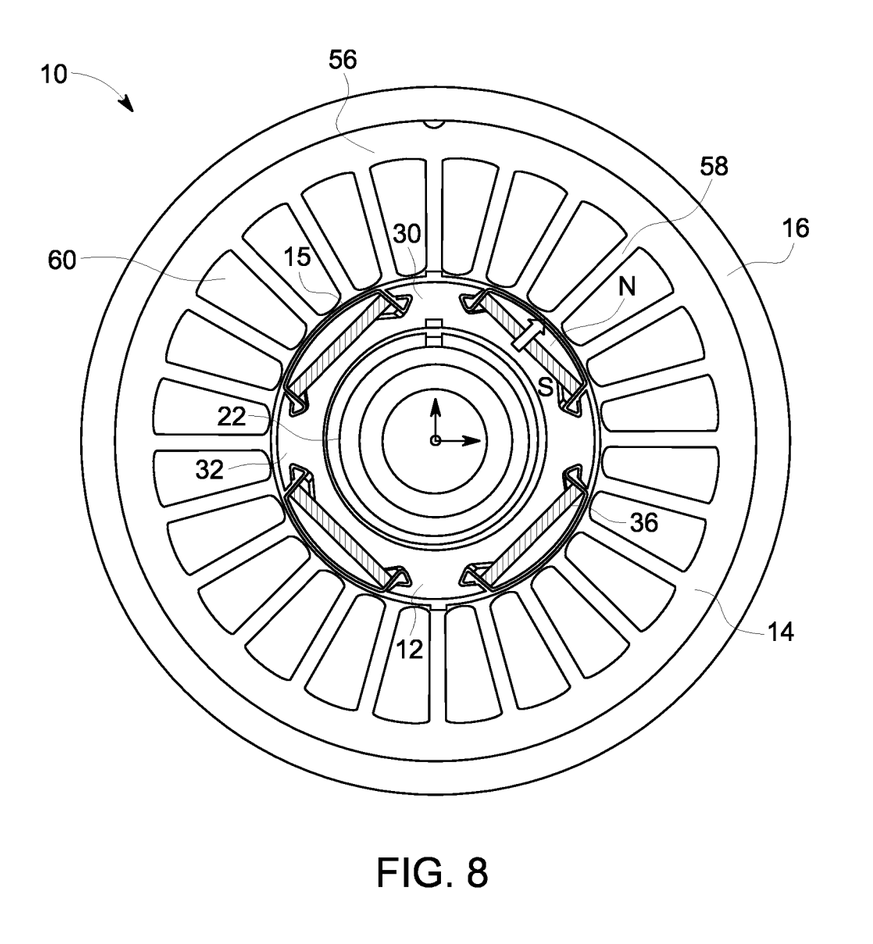
FIG. 8 is an axial cross-sectional view of a rotor and stator assembly taken through line 8-8 of the permanent magnet machine of FIG. 7 in accordance with one or more embodiments shown or described herein.
Figure 9:
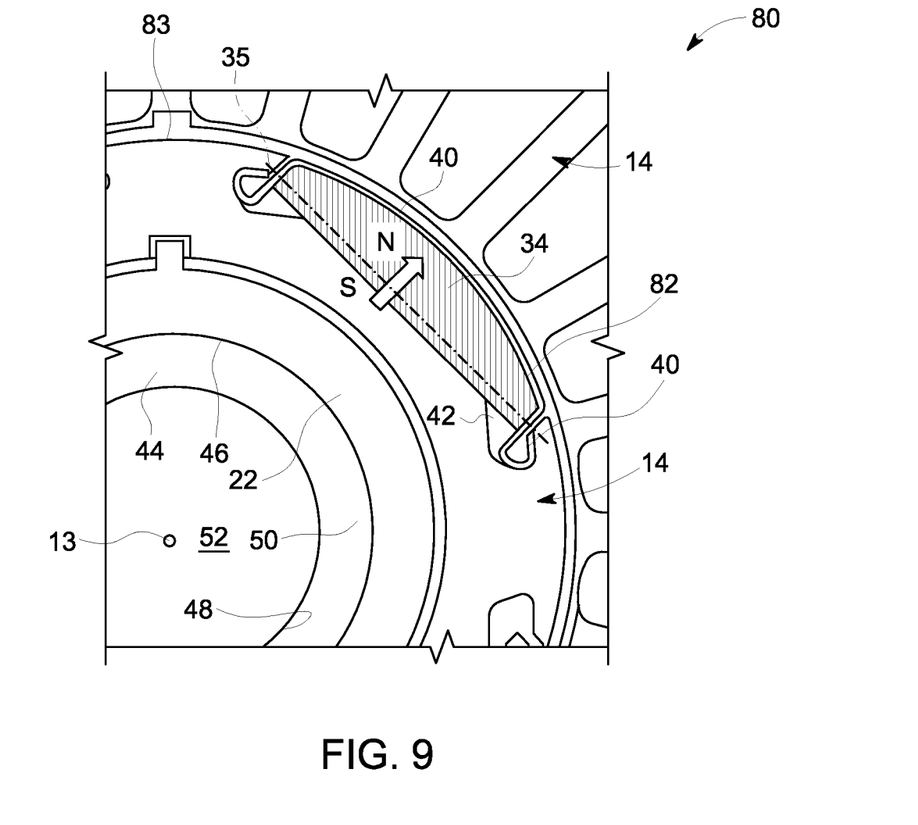
FIG. 9 is an enlarged portion of the axial cross-sectional view of the rotor and stator assembly of FIG. 8 in accordance with one or more embodiments shown or described herein.

Referring now to FIGS. 8 and 9, illustrated in FIG. 8 is an axial cross-sectional view taken along line 8-8 of FIG. 7 of a portion of the permanent magnet motor 80, and more specifically through the stator assembly 14 and a single rotor module of the plurality of rotor modules 20 of the rotor assembly 12. FIG. 9 illustrates an axial cross-sectional view of an enlarged portion of the permanent magnet motor 80 of FIG. 8. As illustrated, the rotor assembly 12 is generally configured in the manner of the embodiment previously described with regard to FIGS. 1-4, and includes each of the rotor modules 20 comprised of a rotor core 30 formed of a plurality of clamped laminations 31 and a rotor shaft 22 coupled to the rotor core 12. In an embodiment, the rotor shaft may include one or more features (not shown), such as protrusions, in cooperative engagement with one or more features (not shown), such as recesses, in the rotor core 12, so as to be in a keyed relationship. In an embodiment, the rotor shaft may include one or more features, such as protrusions 21, in cooperative engagement with one or more features, such as recesses 23, in the rotor core 12, or vice versa. In an embodiment, the shaft 22 may include additional features configured to provide passages for a cooling fluid (not shown) within the rotor core 30. In a non-limiting example, the cooling fluid may be airflow or a coolant for reducing mechanical stresses and eddy current losses in the rotor assembly 12.

The rotor assembly 12 includes multiple permanent magnets 34 disposed at least partially within a plurality of recesses 82 formed in a surface 83 of the rotor core 12. The permanent magnets 34 generate a magnetic field to be radially directed in the air gap 15 between the rotor assembly 12 and the stator assembly 14. Similar to the previously described embodiment, the magnetic field generated by the permanent magnets 34 further interacts with a stator magnetic field to produce a torque. As best illustrated in FIG. 9, the permanent magnets 34 are disposed within recesses 82 formed in the rotor core 30. In this embodiment, the permanent magnets 34 are considered surface mounted magnets. A plurality of retaining clips 40 are disposed relative to the rotor core 30 so as to maintain positioning of the permanent magnets 34 within the recesses 82. More specifically, each of the plurality of retaining clips 40 are configured to retain the multiple permanent magnets 34 relative to the rotor assembly 12 and prevent splaying during high-speed rotations due to a centrifugal force generated in the high-speed rotor core 12. In an embodiment, each of the plurality of retaining clips 40 is configured to provide spring-loaded retainment of the plurality of permanent magnets 34 within the recesses 82. In this particular embodiment, the plurality of permanent magnets 34 are configured having a long axis 35 oriented substantially circumferentially about the rotor core 30.

As previously described, the permanent magnets 34 may be made of neodymium-boron-iron, samarium-cobalt, ferrite, or Alnico. In an embodiment, a filler material 42 may be included within the recesses 82 to further provide containment in case of magnet crack.

As previously described, the rotor assembly 12 may include a stationary tube 44 arranged co-axially in the center of the rotor core 12. An inner surface 46 of the shaft 22 and an outer surface 48 of the stationary tube 44 provide a rotor inner bore 50 for out flow of a cooling fluid. In one embodiment, the stationary tube 44 is a hollow tube with a center bore 52 for allowing an inflow of cooling fluid.

Referring again to FIG. 8, the stator assembly 14 of the permanent magnet motor 80 includes a stator core 56. As illustrated herein, the stator core 56 includes stator structures 58 arranged circumferentially forming a cavity (illustrated with the rotor assembly 12 disposed therein) at a center of the stator core 56. The stator assembly 14 generates a magnetic field and extends along the longitudinal axis 13 (shown in FIG. 6). The rotor assembly 12, as discussed above, is disposed within the cavity defined by the stator core 56. The stator assembly 14 includes multiple stator-slots 60 for concentrated windings (not shown) in between multiple stator structures 58.

Figure 10:
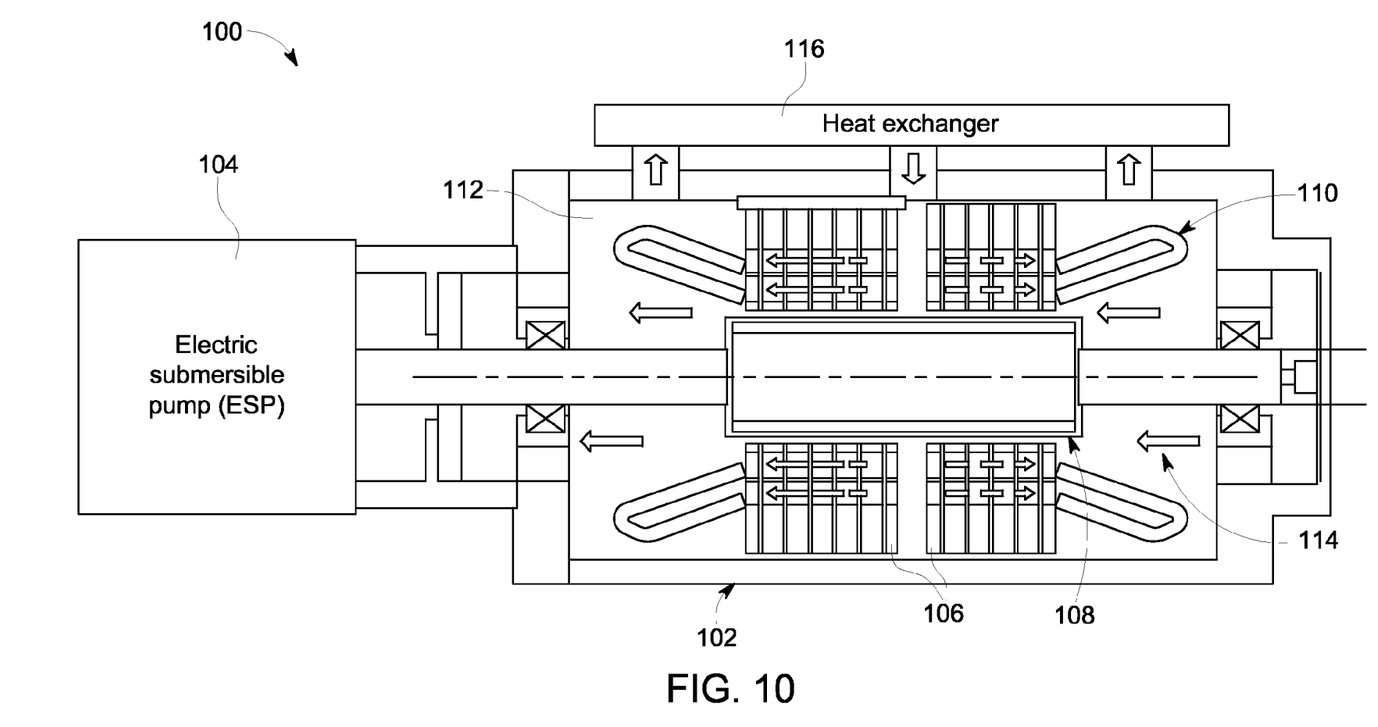
FIG. 10 is cross-sectional view of a pump assembly including an electric submersible pump and permanent magnet motor for driving the pump in accordance with one or more embodiments shown or described herein.

Referring now to FIG. 10, illustrated is a pump assembly 100 including a permanent magnet motor 102 for use in driving a pump. More specifically, illustrated is a permanent magnet motor 102, generally similar to permanent magnet motors 10, 70 or 80, as previously described with regard to FIGS. 1-9. In the illustrated embodiment, the pump is an electric submersible pump (ESP) 104 according to one embodiment. The pump assembly 100 includes the permanent magnet motor 102 comprising a stator assembly 106 and a rotor assembly 108, generally similar to rotor assembly 12 and stator assembly 14 previously described. A plurality of windings 110 are disposed in a plurality of stator slots. The rotor assembly 108 comprises a plurality of permanent magnets previously described with reference to FIGS. 1-8 and configured as surface mounted permanent magnets or internal permanent magnets. The rotor assembly 108 also includes a plurality of retaining clips configured to retain the permanent magnets on a surface of or within a rotor core of the rotor assembly 108, also described previously with reference to FIGS. 1-8.

In an embodiment, a machine cavity 112 is filled with a clean cooling fluid having a suitable thermal conductivity while also possessing workable electrical insulation characteristics. More particularly, in an embodiment, the machine cavity 112 is filed with a pump cooling fluid 114. The pump cooling fluid 114 works to provide cooling of the stator assembly 106, the rotor assembly 104, and a plurality of associated bearings (not shown), generally similar to the bearings 24 and 26 of FIGS. 1-8. In another embodiment a motor sealing can encapsulates both the stator assembly 106 and the rotor assembly 104 for corrosion protection when processed fluid is used for cooling. In an embodiment, a heat exchanger 116 may be included and operate to transfer heat from the motor 102 to an exterior fluid flow.

Figure 11:
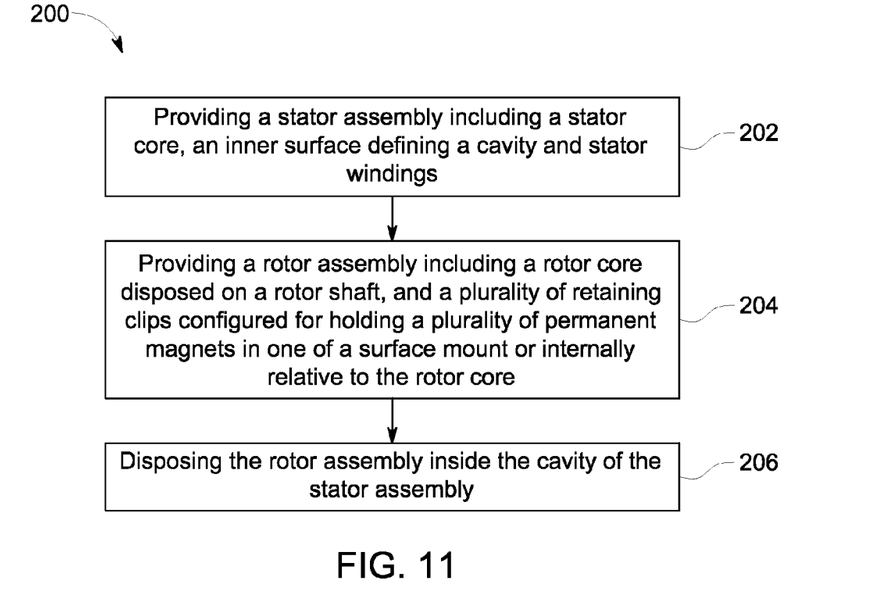
FIG. 11 is a flow chart representing step in a method for assembly a permanent magnet machine in accordance with one or more embodiments shown or described herein.

FIG. 11 is a flow chart representing steps in a method 200 for assembling a permanent magnet machine, and more particularly a permanent magnet motor according to the disclosure. The method 200 includes providing a stator assembly including a stator core in step 202. The stator assembly extends along a longitudinal axis with an inner surface defining a cavity. The stator assembly is further configured with stator windings to generate a stator magnetic field when excited with alternating currents. At step 204, the method 200 includes providing a rotor assembly with a rotor core configured for holding multiple permanent magnets in one of a surface mount or internal position. The rotor assembly including a plurality of retaining clips configured to retain the permanent magnets relative to the rotor core. The rotor core of the permanent magnet motor machine is disposed, at step 206, inside the cavity formed by the stator core and is configured to rotate via a rotor shaft about the longitudinal axis. The rotor shaft may include engagement features to cooperatively engage the rotor shaft and the rotor core. The multiple permanent magnets are configured to generate a magnetic field, which magnetic field interacts with the stator magnetic field to produce a torque.

Advantageously, the various embodiments disclosed herein provide a larger torque such that the number of motors needed to drive a component, such as an electric submersible pump, can be reduced, therefore decreasing the overall system cost and complexity. The use of a permanent magnet motor for driving a submersible pump, such as disclosed herein, also enables efficient pump operation at higher speeds thus increasing the pumping capacity. In addition, the efficiency of the permanent magnet motor is higher than the induction alternative so that overall system efficiency is increased.

The rotor assembly and the various associated components are primarily configured to provide maximum power density and minimum eddy current losses. In an embodiment, the inclusion of the retaining clips minimizes, if not eliminates, the inclusion of multiple bridges and center posts and thus provides enhanced structural strength of the rotor and various other parts. In addition, the described embodiments lead to a decrease in magnet flux leakage thus significantly improving the machine power density, resulting in increased efficiency of the machine. Furthermore, the present disclosure provides additional advantages in terms of low volume, mass and cost. These techniques and systems thus, allow for highly efficient permanent magnet machines.

The permanent magnet machines, as described above, may be well suited as a driving force for submersible pump applications. However, such permanent magnet machines may be employed in a variety of other applications. One of them includes aviation applications, such as in aircraft engines. The permanent magnet machines can also be used for other non-limiting examples such as traction applications, wind and gas turbines, starter-generators for aerospace applications, industrial applications and appliances.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While only certain features of the embodiments have been illustrated and described herein, many modifications and changes will occur to those skilled in the art. It is, therefore, to be understood that the appended claims are intended to cover all such modifications and changes as fall within the true spirit of the invention.

What is claimed is:

1. A rotor assembly for a permanent magnet machine configured to rotate about a longitudinal axis, the rotor assembly comprising:
    a rotor shaft; and
    a plurality of rotor modules configured to generate a magnetic field, whose magnetic field interacts with a stator magnetic field to produce a torque, the plurality of rotor modules disposed about the rotor shaft in an end-to-end axial alignment and cooperative engagement, each of the plurality of rotor modules comprising:
        a rotor core;
        a plurality of permanent magnets; and
        a plurality of retaining clips configured to retain the plurality of permanent magnets relative to the to the rotor core, each of the plurality of retaining clips including a plurality of recurve end portions, wherein a bend angle of each of the plurality of recurve end portions is greater than 180°.

2. The rotor assembly as claimed in claim 1, further comprising a plurality of bearings disposed therebetween each of the plurality of rotor modules and a plurality of end bearings disposed on axial ends of the rotor shaft.

3. The rotor assembly as claimed in claim 1, further comprising a plurality of cavities defined in the rotor core and wherein each of the plurality of permanent magnets is disposed within one of the plurality of cavities to form an internal permanent magnet motor.

4. The rotor assembly as claimed in claim 1, wherein a magnetization direction of each of the plurality of permanent magnets is configured relative to the rotor core as one of radially inward, radially outward or circumferential.

5. The rotor assembly as claimed in claim 1, further comprising a plurality of recess defined in an outer surface of the rotor core and wherein each of the plurality of permanent magnets is disposed at least partially within one of the plurality of recesses to form a surface mount permanent magnet motor.

6. The rotor assembly as claimed in claim 1, wherein the permanent magnet machine is a permanent magnet motor for driving an electric submersible pump.

7. A permanent magnet machine comprising:
a stator assembly comprising a stator core and including stator windings to generate a stator magnetic field when excited with alternating currents, the stator assembly extending along a longitudinal axis with an inner surface defining a cavity; and
a rotor assembly disposed inside said cavity and configured to rotate about the longitudinal axis, wherein the rotor assembly comprises a plurality of rotor modules configured to generate a magnetic field, which magnetic field interacts with a stator magnetic field to produce a torque, each of the plurality of rotor modules comprising a rotor core, a plurality of permanent magnets and a plurality of retaining clips configured to retain the plurality of permanent magnets relative to the to the rotor core, each of the plurality of retaining clips including a plurality of recurve end portions, wherein a bend angle of each of the plurality of recurve end portions is greater than 180°.

8. The permanent magnet machine as claimed in claim 7, further comprising a plurality of bearings disposed there between each of the plurality of rotor modules and a plurality of end bearing disposed on axial ends of the rotor shaft.

9. The permanent magnet machine as claimed in claim 7, further comprising a plurality of cavities defined in the rotor core and wherein each of the plurality of permanent magnets is disposed within one of the plurality of cavities to form an internal permanent magnet motor.

10. The permanent magnet machine as claimed in claim 7, further comprising a plurality of recess defined in an outer surface of the rotor core and wherein each of the plurality of permanent magnets is disposed at least partially within one of the plurality of recesses to form a surface mount permanent magnet motor.

11. The permanent magnet machine as claimed in claim 7, wherein each of the plurality of retaining clips are configured to provide spring-loaded retainment of the plurality of permanent magnets relative to the rotor core.

12. The permanent magnet machine as claimed in claim 11, wherein the plurality of retaining clips are configured to further provide spring-loaded retainment of a plurality of keeper magnet blocks relative to the rotor core.

13. The permanent magnet machine as claimed in claim 8, wherein the permanent magnet machine is a permanent magnet motor for driving an electric submersible pump.

14. A pump assembly comprising:
an electric submersible pump (ESP); and
a permanent magnet motor configured to drive the electric submersible pump, the permanent magnet motor comprising:
a stator assembly comprising a stator core and including stator windings to generate a stator magnetic field when excited with alternating currents, the stator assembly extending along a longitudinal axis with an inner surface defining a cavity; and
a rotor assembly disposed inside said cavity and configured to rotate about the longitudinal axis, wherein the rotor assembly comprises:
a rotor shaft; and
a plurality of rotor modules configured to generate a magnetic field, which magnetic field interacts with a stator magnetic field to produce a torque, the plurality of rotor modules disposed about the rotor shaft in an end-to-end axial alignment and cooperative engagement, each of the plurality of rotor modules comprising:
a rotor core;
a plurality of permanent magnets; and
a plurality of retaining clips configured to retain the plurality of permanent magnets relative to the to the rotor core, each of the plurality of retaining clips including a plurality of recurve end portions, wherein a bend angle of each of the plurality of recurve end portions is greater than 180°.

15. The pump assembly as claimed in claim 14, further comprising a plurality of bearings disposed therebetween each of the plurality of rotor modules and a plurality of end bearing disposed on axial ends of the rotor shaft.

16. The pump assembly as claimed in claim 14, further comprising a plurality of cavities defined in the rotor core and wherein each of the plurality of permanent magnets is disposed within one of the plurality of cavities to form an internal permanent magnet motor.

17. The pump assembly as claimed in claim 14, further comprising a plurality of recess defined in an outer surface of the rotor core and wherein each of the plurality of permanent magnets is disposed at least partially within one of the plurality of recesses to form a surface mount permanent magnet motor.

18. The pump assembly as claimed in claim 14, wherein the plurality of retaining clips are configured to provide spring-loaded retainment of the plurality of permanent magnets relative to the rotor core.

19. The permanent magnet machine as claimed in claim 18, wherein the plurality of retaining clips are configured to further provide spring-loaded retainment of a plurality of keeper magnet blocks relative to the rotor core.

20. A method for assembling a permanent magnet machine, the method comprising:
providing a stator assembly comprising a stator core and an inner surface defining a cavity, the stator assembly configured with stator windings to generate a stator magnetic field when excited with alternating currents and extending along a longitudinal axis; and
providing a rotor assembly disposed inside said cavity and configured to rotate about the longitudinal axis, wherein the rotor assembly comprises:

a rotor shaft; and
a plurality of rotor modules configured to generate a magnetic field, which magnetic field interacts with a stator magnetic field to produce a torque, the plurality of rotor modules disposed about the rotor shaft in an end-to-end axial alignment and cooperative engagement, each of the plurality of rotor modules comprising:
a rotor core;
a plurality of permanent magnets; and
a plurality of retaining clips configured to retain the plurality of permanent magnets relative to the to the rotor core, each of the plurality of retaining clips including a plurality of recurve end portions, wherein a bend angle of each of the plurality of recurve end portions is greater than 180°.

* * * * *